(12) United States Patent
Jeong et al.

(10) Patent No.: US 11,885,908 B2
(45) Date of Patent: Jan. 30, 2024

(54) APPARATUS AND METHOD OF SELECTING SOURCES OF ILLUMINATION TO BE JAMMED FOR PASSIVE RADAR JAMMING

(71) Applicant: AGENCY FOR DEFENSE DEVELOPMENT, Daejeon (KR)

(72) Inventors: Inhwan Jeong, Daejeon (KR); Sanhae Kim, Daejeon (KR); Hyungyu Kwak, Daejeon (KR); Jonghwan Lee, Daejeon (KR); Kyuha Song, Daejeon (KR); Byungnam Lee, Daejeon (KR)

(73) Assignee: Agency for Defense Development, Daejeon (KR)

( * ) Notice: Subject to any disclaimer, the term of this patent is extended or adjusted under 35 U.S.C. 154(b) by 18 days.

(21) Appl. No.: 17/733,049

(22) Filed: Apr. 29, 2022

(65) Prior Publication Data
US 2023/0251349 A1     Aug. 10, 2023

(30) Foreign Application Priority Data
Feb. 10, 2022    (KR) .......................... 10-2022-0017383

(51) Int. Cl.
*G01S 7/38*     (2006.01)
(52) U.S. Cl.
CPC ...................................... *G01S 7/38* (2013.01)
(58) Field of Classification Search
CPC ........ G01S 7/417; G01S 7/2883; G01S 13/50; G01S 13/931; G01S 13/003; G01S 7/38; G01S 7/36; G06N 20/00; G06N 3/04
See application file for complete search history.

(56) References Cited

U.S. PATENT DOCUMENTS

| 7,068,209 B2 * | 6/2006 | Gounalis | ................ H04K 3/825 |
| | | | 342/99 |
| 11,063,563 B1 * | 7/2021 | Jackson | ................ H04L 27/361 |

(Continued)

FOREIGN PATENT DOCUMENTS

| KR | 10-0791239 B1 | 1/2008 |
| KR | 10-2013-0010830 A | 1/2013 |

(Continued)

OTHER PUBLICATIONS

International Search Report of corresponding PCT application No. PCT/KR2022/005890 dated Nov. 7, 2022.

(Continued)

*Primary Examiner* — Bernarr E Gregory
*Assistant Examiner* — Kenneth W Good
(74) *Attorney, Agent, or Firm* — Knobbe, Martens, Olson & Bear, LLP

(57) ABSTRACT

This application relates to a method for selecting sources of illumination to jam, performed by an apparatus of selecting sources of illumination to jam for passive radar jamming. The method may include, predicting sources of illumination used by a virtual passive radar of interest disposed within a jamming range with respect to the location of a passive radar jammer. The method may also include selecting sources of illumination as candidates for jamming if the signal strength of a target reflection signal received by the virtual passive radar of interest from the sources of illumination is equal to or greater than an acceptable received signal strength. The method may further include picking out which sources of illumination to jam from the sources of illumination selected as candidates for jamming, based on how frequently the virtual passive radar of interest uses each of the selected candidates for jamming.

20 Claims, 5 Drawing Sheets

(56) References Cited

U.S. PATENT DOCUMENTS

2011/0128181 A1    6/2011  Galati
2020/0166607 A1*   5/2020  Jolly ..................... G01S 13/88

FOREIGN PATENT DOCUMENTS

| KR | 10-1815387 B1   | 1/2018  |
|----|-----------------|---------|
| KR | 10-2020-0114442 A | 10/2020 |
| KR | 10-2169085      | 10/2020 |

OTHER PUBLICATIONS

Extended European Search Report dated Jul. 4, 2023 in European Application No. 23155630.9.
Wang et al., "A Technique for Jamming Bi- and Multistatic SAR Systems," IEEE Geoscience and Remote Sensing Letters, vol. 4, No. 1 (Jan. 2007).

\* cited by examiner

APPARATUS AND METHOD OF SELECTING SOURCES OF ILLUMINATION TO BE JAMMED FOR PASSIVE RADAR JAMMING

CROSS-REFERENCE TO RELATED APPLICATION

This application claims priority to Korean Patent Application No. 10-2022-0017383 filed on Feb. 10, 2022. The entire contents of the application on which the priority is based are incorporated herein by reference.

BACKGROUND

Technical Field

The present disclosure relates to an apparatus of selecting sources of illumination to jam for passive radar jamming and a method of selecting sources of illumination to jam which is performed by the apparatus.

Description of Related Technology

Multistatic PCL-based passive radars are a battlefield surveillance system that detects the spatial location of moving targets and tracks the targets, without transmitting radio waves themselves, by using signals emanating from a plurality of third sources of illumination such as FM radio broadcasting, digital TV broadcasting, and digital audio broadcasting. Since these passive radars do not emanate signals directly, they are capable of covert surveillance and highly robust against jamming Thus, active research on this technology is being conducted, especially in developed countries such as the United States and Germany, and it is expected that there will be a shift in the future to a battlefield environment in which both active radars and passive radars are simultaneously operated. Accordingly, there is a growing need for the development of a jamming technology for countering passive radars which are capable of battlefield surveillance without transmitting radio waves themselves, so as to improve the survivability of fighter aircraft in future battlefields.

SUMMARY

An embodiment of the present disclosure provides an apparatus and method of selecting sources of illumination to jam for passive radar jamming, without prior information such as a passive radar's location and the sources of illumination used by the passive radar.

According to embodiments of the present disclosure, it is possible to select sources of illumination to jam for passive radar jamming, without prior information such as a passive radar's location and the sources of illumination used by the passive radar.

The aspects of the present disclosure are not limited to the foregoing, and other aspects not mentioned herein will be clearly understood by those skilled in the art from the following description.

DETAILED DESCRIPTION

In order to jam a passive radar to keep it from working normally, it is necessary to obtain the location of the passive radar to be jammed and information on the source of illumination used by the passive radar, such as a broadcasting channel, a transmit frequency, and the location of the source of illumination, and to transmit a jamming signal tuned in to the broadcasting channel. However, it is quite difficult for a passive radar jammer to obtain such information since passive radars use signals from third sources of illumination without transmitting radio waves themselves, and any related technologies have been disclosed so far.

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
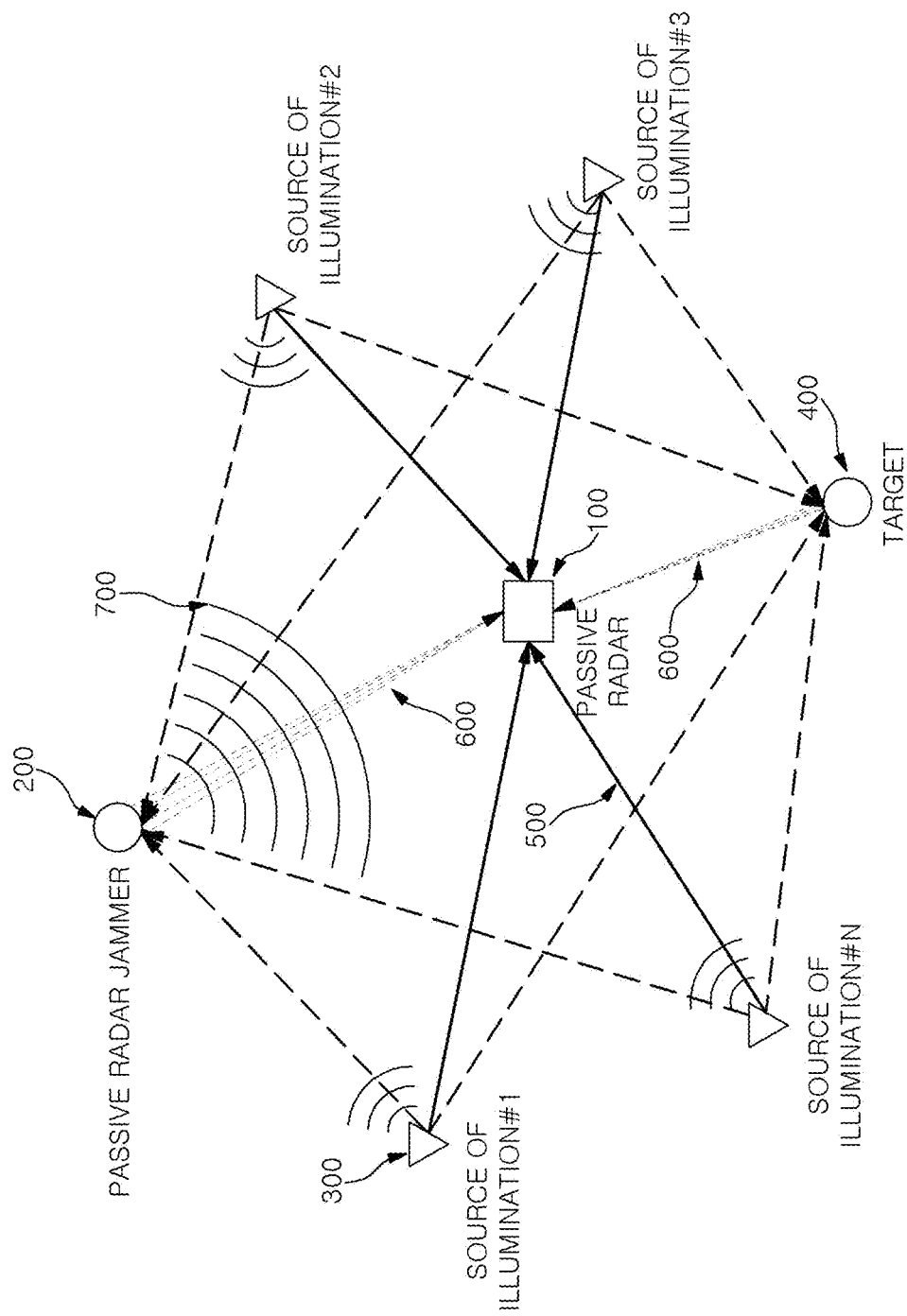
FIG. 1 is a diagram for explaining an example of a passive radar and a passive radar jammer to which an apparatus and method of selecting sources of illumination to jam according to an embodiment of the present disclosure are applicable.

FIG. 1 is a diagram for explaining an example of a passive radar 100 and a passive radar jammer 200 to which an apparatus and method of selecting sources of illumination to jam according to an embodiment of the present disclosure are applicable.

Referring to FIG. 1, the passive radar 100 detects the location of a passive radar jammer 200 and the location of a target 400 by using reference signals 500, which emanate from a plurality of sources of illumination 300 #1~#N and are received directly by the passive radar 100, and target reflection signals 600, which are received by the passive radar 100 as signals emanating from the plurality of sources of illumination 300 #1~#N are reflected off a single or multiple moving passive radar jammers 200 and a single or multiple targets 400.

The passive radar jammer 200 predicts which of the N sources of illumination 300 the passive radar 100 uses, without prior information, and generates and transmits jamming signals 700 based on signals received from these sources of illumination 300, thereby interfering with normal operation of the passive radar 100.

Figure 2:
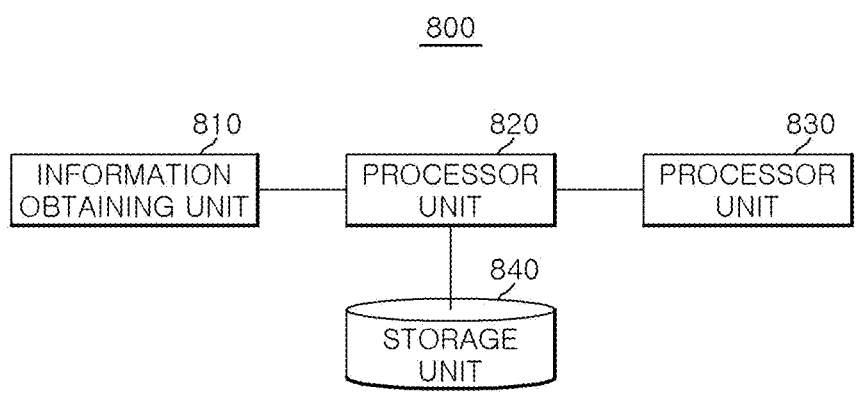
FIG. 2 is a configuration diagram of an apparatus of selecting sources of illumination to jam according to an embodiment of the present disclosure.
Figure 3:
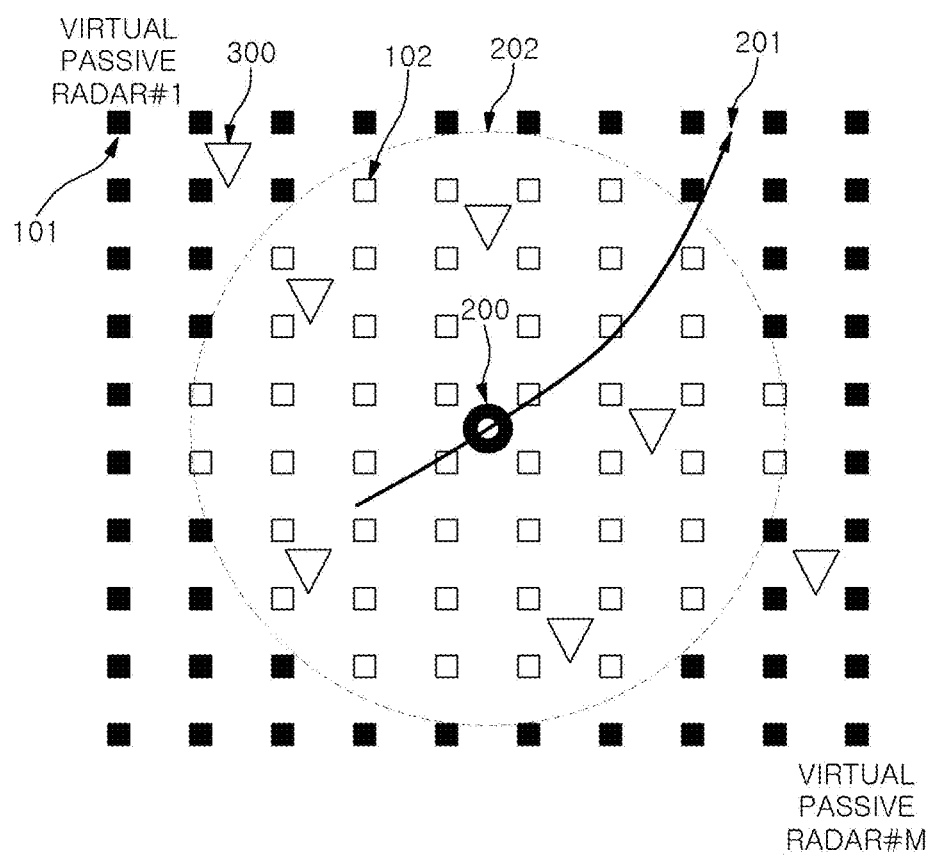
FIG. 3 depicts an example for explaining the concept of selecting sources of illumination to jam for passive radar jamming by a passive radar jammer according to an embodiment of the present disclosure.

FIG. 2 is a configuration diagram of an apparatus 800 of selecting sources of illumination to jam according to an embodiment of the present disclosure. FIG. 3 depicts an example for explaining the concept of selecting sources of illumination to jam for passive radar jamming by a passive radar jammer 200 according to an embodiment of the present disclosure.

Referring to FIGS. 2 and 3, the apparatus 800 of selecting sources of illumination to jam includes an information obtaining unit 810 and a processor unit (or a processor) 820. The apparatus 800 of selecting sources of illumination to jam may include an output unit 830 and/or a storage unit 840.

The information obtaining unit 810 obtains the locations of a plurality of virtual passive radars disposed in a movement region of the passive radar jammer and the locations of a plurality of sources of illumination and their output information, and provides the obtained information to the processor unit 820. M virtual passive radars 101 may be disposed in a grid or a given pattern in a desired movement region, considering a movement path 201 of the passive radar jammer 200. For example, the information obtaining unit 810 may include an interface for receiving inputs of various information and/or a communication module for receiving various information.

The processor unit 820 picks out which sources of illumination to jam from the plurality of sources of illumination, based on the information obtained by the information obtaining unit 810. For example, the processor unit 820 may include a microprocessor.

The output unit 830 may externally present a processing result from the processor unit 820, for example, a determination as to which sources of illumination to jam. For example, the output unit 830 may include a monitor and/or a printer which visually presents the determination as to which sources of illumination to jam, and a communication module for transmitting the determination as to which sources of illumination to jam.

The storage unit 840 may store a computer program for performing each of the steps of a method of selecting sources of illumination to jam for passive radar jamming, and may store various processing results from the processor unit 820.

The processor unit 820 of the apparatus 800 of selecting sources of illumination to jam predicts sources of illumination suitable for use by each of the virtual passive radars 101, based on the locations of the virtual passive radars 101 in the movement path 201 of the passive radar jammer 200 and the locations of the sources of illumination 300 and their output information.

Also, the processor unit 820 sets a jamming range 202 with respect to the location of the passive radar jammer 200 and defines a virtual passive radar 101 present within the jamming range as a virtual passive radar of interest 102.

Afterwards, based on information on a source of illumination the virtual passive radar of interest 102 is predicted to use, the processor unit 820 calculates the received signal strength of a target reflection signal 600 which is received by the virtual passive radar of interest 102 as a signal emanating from the predicted source of illumination is reflected off the passive radar jammer 200, and checks if the calculated received signal strength is equal to or greater than a received signal strength acceptable by the virtual passive radar of interest 102.

Moreover, the processor 820 selects sources of illumination as candidates for jamming if their signal strength is equal to or greater than a received signal strength acceptable by the virtual passive radar of interest 102, calculates how frequently the virtual passive radar of interest 102 uses each of the selected candidates for jamming, and picks out as many of these candidates as the number of frequency channels that can be emanated from the passive radar jammer 200, in order from most frequently used. As such, when picking out which sources of illumination to jam, if the virtual passive radar of interest 102 uses some of the candidates with equal frequency, audio source quality analysis may be performed on each of the sources of illumination, and the sources of illumination to jam may be picked out based on analysis results.

Figure 4A:
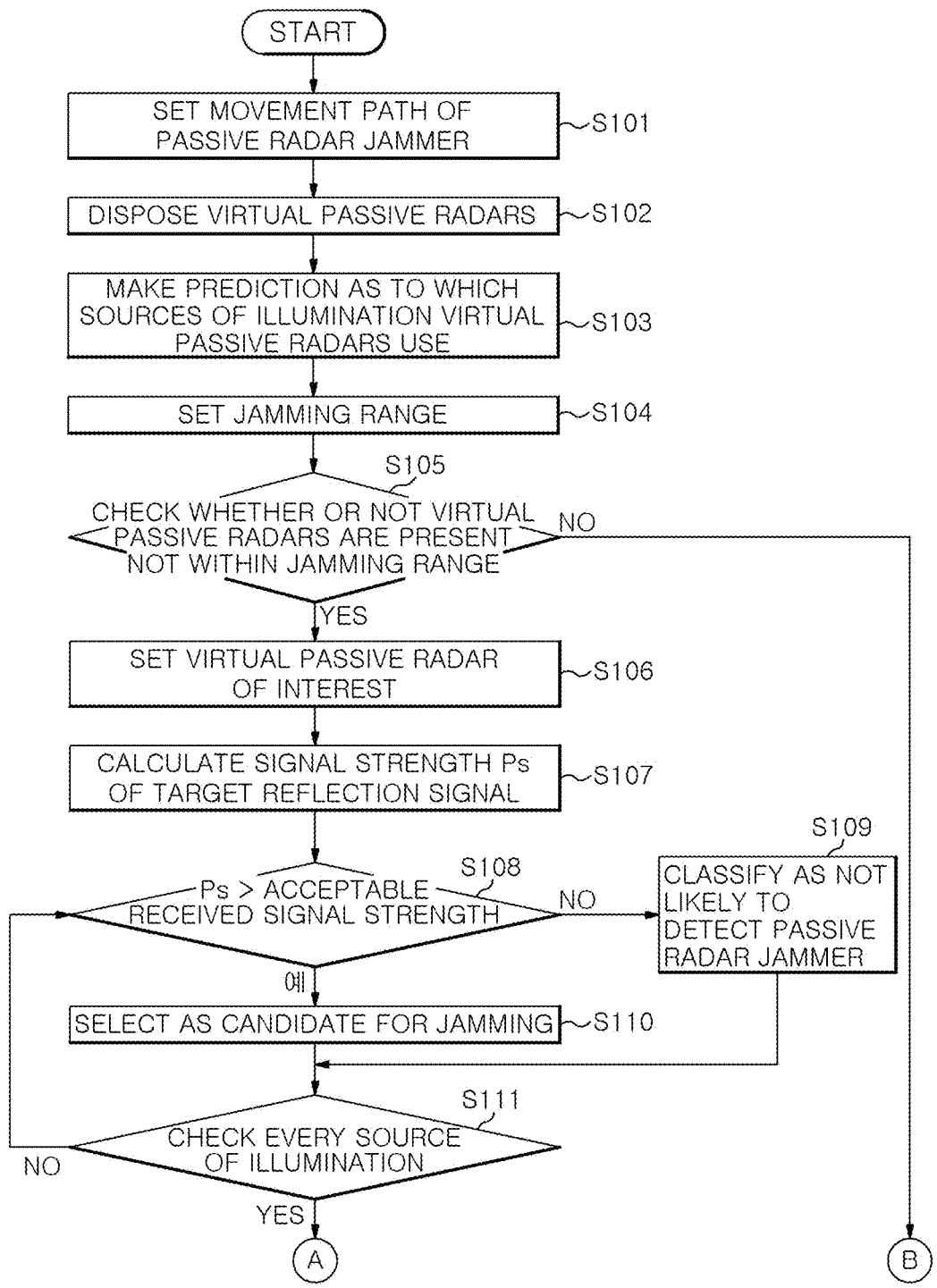
FIGS. 4A and 4B show a flowchart for explaining a method of selecting sources of illumination to jam for passive radar jamming according to an embodiment of the present disclosure.
Figure 4B:
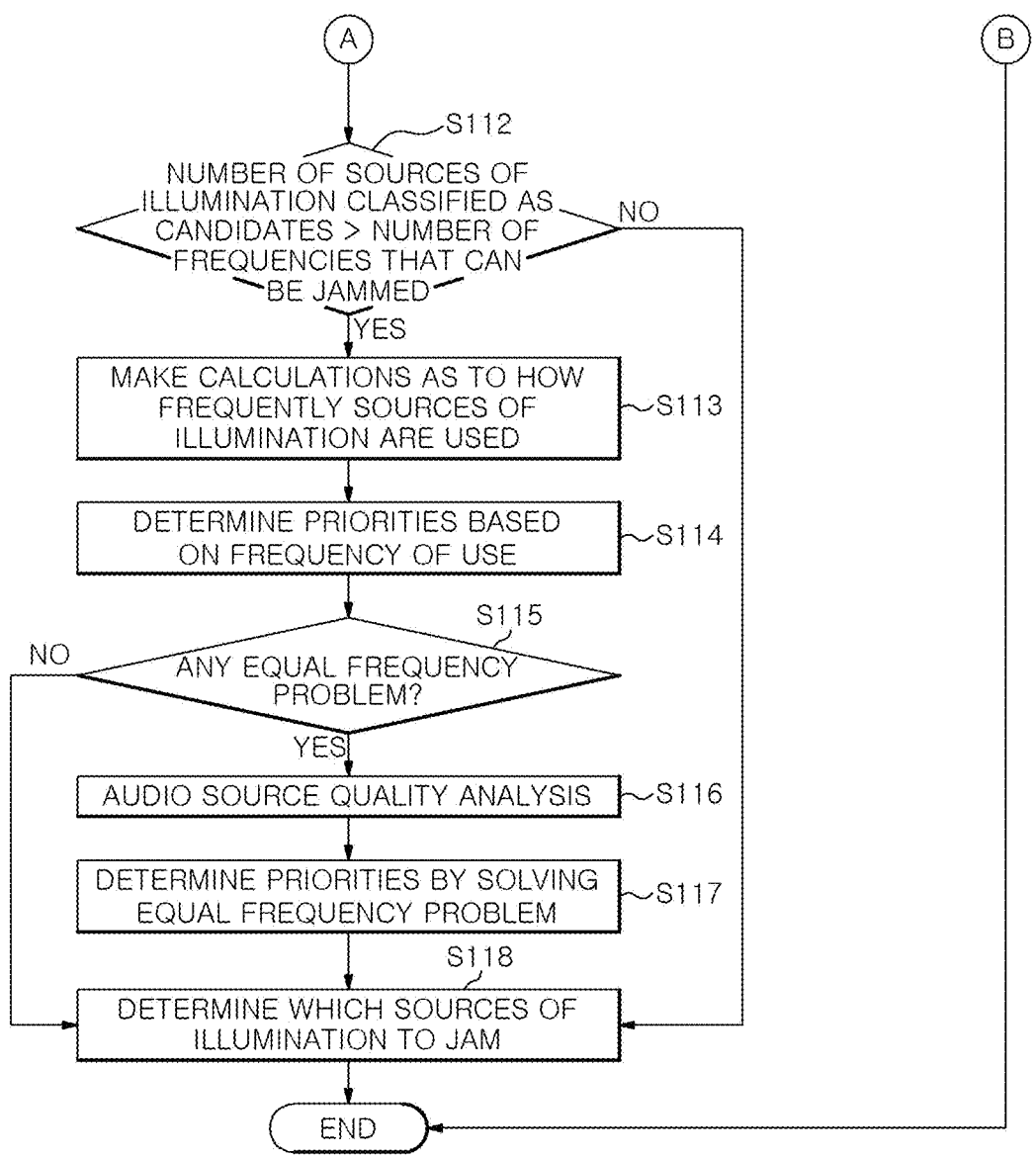

FIGS. 4A and 4B show a flowchart for explaining a method of selecting sources of illumination as candidates for passive radar jamming according to an embodiment of the present disclosure.

Referring to FIGS. 1 to 4B, the method of selecting sources of illumination to jam, performed by the apparatus 800 of selecting sources of illumination to jam for passive radar jamming, will be described in detail.

First, when the movement path 201 of the passive radar jammer 200 is set (S101), M virtual passive radars 101 are disposed (S102) in a desired movement region, according to preset criteria.

Afterwards, based on the locations of the virtual passive radars 101 and information on nearby sources of illumination, a prediction (S103) is made as to which sources of illumination the virtual passive radars 101 use. In this instance, the prediction as to which sources of illumination the virtual passive radars 101 use may be made by using received signal strength or a visible path between transmitter and receiver, and as many sources of illumination as designated by an operator or all nearby sources of illumination may be set as the sources of illumination used.

Moreover, a jamming range 202 is set (S104) with respect to the location of the passive radar jammer 200 along the movement path 201. In this instance, the jamming range 202 may be set differently depending on the type of a platform equipped with the passive radar jammer 200 and a predicted range detectable by passive radars 100.

Additionally, it is checked (S105) whether or not virtual passive radars 101 are present within the set jamming range 202. If the result shows that no virtual passive radar 101 is present, there is no need to select sources of illumination to jam. If a virtual passive radar 101 is present within the set jamming range 202, the virtual passive radar 101 within the jamming range 202 is set (S106) as a virtual passive radar of interest 102.

After the virtual passive radar of interest 102 is set, the received signal strength of a target reflection signal $P_s$, which is received by the virtual passive radar of interest 102 as a signal emanating from a source of illumination is reflected off the passive radar jammer 200, is calculated (S107) by using Equation 1, for every source of illumination the virtual passive radar of interest 102 is predicted to use:

$$P_S = \frac{P_T G_T G_R S_0 \lambda^2}{(4\pi)^3 R_1^2 R_2^2 L} \quad \text{[Equation 1]}$$

where $P_\tau$ is the transmit power of the source of illumination, $G_\tau$ is the antenna gain of the source of illumination, $G_R$ is the antenna gain of the virtual passive radar of interest 102, $S_0$ is the RCS (radar cross section) of the passive radar jammer 200, $\lambda$ is the wavelength of the signal from the source of illumination, $R_1$ is the distance between the source of illumination and the passive radar jammer 200, $R_2$ is the distance between the passive radar jammer 200 and the passive radar jammer of interest 102, and L is the system loss of the virtual passive radar of interest 102.

Assuming that the minimum strength of the target reflection signal acceptable by the virtual passive radar of interest 102 is denoted by $P_{smin}$, it is possible to check (S108) whether or not the virtual passive radar of interest 102 is able to detect the passive radar jammer 200 by using the corresponding source of illumination as in the following Equation 2:

$$P_S > P_{smin} \quad \text{[Equation 2]}$$

If a source of illumination does not satisfy Equation 2, this source of illumination is classified (S109) as not likely to be used by the virtual passive radar of interest 102 in detecting the passive radar jammer 200 and is therefore not selected as a candidate for jamming. On the other hand, if a source of illumination satisfies Equation 2, this source of illumination is classified as likely to be used by the virtual passive radar of interest 102 in detecting the passive radar jammer 200 and is therefore selected (S110) as a candidate for jamming.

Every source of illumination the virtual passive radar of interest 102 is predicted to use is checked (S111) to determine whether or not they satisfy a reference received signal strength for the target reflection signal, and the total number of sources of illumination classified as candidates for jamming and the number of frequency channels that can be jammed by the passive radar jammer 200 are compared (S112).

If the number of sources of illumination classified as candidates for jamming is smaller than the number of frequencies that can be jammed by the jammer, all of the sources of illumination classified as candidates for jamming are selected as sources of illumination to jam.

If the number of sources of illumination classified as candidates for jamming is larger than the number of frequencies that can be jammed by the jammer, calculations (S113) are made as to how frequently the sources of illumination classified as candidates for jamming are used, and the priorities for jamming are determined based on the calculated frequency of use (S114).

Here, the calculations (S113) of how frequently each source of illumination is used are made by checking how frequently the sources of illumination previously selected as candidates for jamming are used by the virtual passive radar of interest 102. For example, it is assumed that three virtual passive radars of interest 102 are present and each of them uses seven sources of illumination, as in the following Table 1, and that Predicted Illumination sources #1 to #5 satisfy the reference received signal strength for the target reflection signal and are selected as candidates for jamming and Predicted illumination sources #6 and #7 do not satisfy the reference received signal strength for the target reflection signal and are not selected as candidates for jamming. In this case, "Illumination source A" and "Illumination source B" are classified as the highest priority for jamming since they can be used by all of the virtual passive radars of interest 102 to detect the passive radar jammer 200, whereas "Illumination source C" and "Illumination source D" are classified as the second highest priority since they can be used by only two of the virtual passive radars of interest 102. Besides, "Illumination source E", "Illumination source F", "Illumination source I", "Illumination source J", and "Illumination source G" are classified as the lowest priority since they are used only one of the virtual passive radars 102, which means that they are only occasionally used.

TABLE 1

| | Virtual passive radar of interest #1 | Virtual passive radar of interest #2 | Virtual passive radar of interest #3 |
| --- | --- | --- | --- |
| Predicted illumination source #1 | Illumination source A 104.5 MHz | Illumination source A 104.5 MHz | Illumination source B 101.9 MHz |
| Predicted illumination source #2 | Illumination source E 94.5 MHz | Illumination source I 104.7 MHz | Illumination source D 106.7 MHz |
| Predicted illumination source #3 | Illumination source C 98.5 MHz | Illumination source B 101.9 MHz | Illumination source J 106.9 MHz |
| Predicted illumination source #4 | Illumination source B 101.9 MHz | Illumination source D 106.7 MHz | Illumination source A 104.5 MHz |
| Predicted illumination source #5 | Illumination source F 91.1 MHz | Illumination source C 98.5 MHz | Illumination source G 97.5 MHz |
| Predicted illumination source #6 | Illumination source G 97.5 MHz | Illumination source G 97.5 MHz | Illumination source C 98.5 MHz |
| Predicted illumination source #7 | Illumination source H 89.9 MHz | Illumination source Z 104.1 MHz | Illumination source I 91.1 MHz |

After determining (S114) the priorities based on the frequency of use, it is checked (S115) if there is an equal frequency problem. In the above example, assuming that the passive radar jammer 200 is able to jam three sources of illumination, "Illumination source A" and "Illumination source B" with the highest priority for jamming are selected first, and then either "Illumination source C" or "Illumination source D" alone should be selected. In the case of this equal frequency problem, the priorities may be determined (S117) by solving the equal frequency problem through audio source quality analysis (S116). The following Tables 2 and 3 show simple examples of criteria for audio source quality analysis according to broadcasting type and how the results of the analysis turned out. The criteria for audio source quality analysis are not limited to broadcasting type, but may be set by considering other indicators as well, such as effective bandwidth measurements for each source of illumination and the continuity of high-quality audio sources. Generally, using music signals having a wide bandwidth brings more advantages to the passive radars 100 than using audio signals having a narrow bandwidth, in terms of detection accuracy. Accordingly, "Illumination source C" whose broadcasting type is "Music" may be given higher priority than "Illumination source D" whose broadcasting type is "Education".

TABLE 2

| Broadcasting type | Music | ... | Standard | ... | Education |
| --- | --- | --- | --- | --- | --- |
| Audio source quality | High | ... | Medium | ... | Low |

TABLE 3

| Broadcasting type | Music | ... | Standard | ... | Education | Score |
| --- | --- | --- | --- | --- | --- | --- |
| Illumination sourceA 104.5 MHz | ○ | ... | | | | 92 |
| Illumination sourceB 101.9 MHz | | | ○ | | | 73 |

TABLE 3-continued

| Broadcasting type | Music | ... | Standard | ... | Education | Score |
|---|---|---|---|---|---|---|
| Illumination sourceC 98.5 MHz | ○ | | | | | 96 |
| Illumination sourceD 106.7 MHz | | | | | ○ | 61 |
| . | | | . | | | |
| . | | | . | | | |
| . | | | . | | | |
| Illumination sourceZ 104.1 MHz | | ... | ○ | ... | | 78 |

Meanwhile, aside from this example, audio source quality may be analyzed by measuring the bandwidth of broadcast signals with these frequencies in real time. Also, if an equal frequency problem arises, this may be solved by considering other criteria as well, such as the average received signal strength of the target reflection signal, aside from the audio source quality analysis, or putting various criteria together.

Afterwards, once the priorities are determined, based on the frequency of use (S114) or by solving the equal frequency problem (S117), a final determination (S118) is made as to which sources of illumination to jam, depending on the number of frequency channels that can be jammed by the passive radar jammer 200.

The passive radar jammer 200 may repeatedly perform the above series of steps as it moves along the movement path, in real time or at specified time intervals, and some of the steps may be omitted or new steps may be added.

Moreover, the sources of illumination to jam for passive radar jamming may be selected by a passive radar jammer or other apparatus supporting the jammer. That is, the apparatus 800 of selecting sources of illumination to jam may be the passive radar jammer 200 or other apparatus supporting the passive radar jammer 200.

As described so far, according to embodiments of the present disclosure, it is possible to select sources of illumination to jam for passive radar jamming, without prior information such as a passive radar's location and the sources of illumination used by the passive radar.

Meanwhile, each of the components of the apparatus 800 of selecting sources of illumination to jam for passive radar jamming according to the foregoing embodiments may be implemented by including one or more microprocessors.

Moreover, each of the steps of the method of selecting sources of illumination to jam for passive radar jamming according to the foregoing embodiments may be implemented by a non-transitory computer-readable recording medium storing a computer program programmed to execute these steps.

Additionally, each of the steps of the method of selecting sources of illumination to jam for passive radar jamming according to the foregoing embodiments may be implemented in the form of a computer program stored in a non-transitory computer-readable recording medium and programmed to execute these steps.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method of selecting sources of illumination to jam, performed by an apparatus of selecting sources of illumination to jam for passive radar jamming, the method comprising:
    predicting sources of illumination used by a virtual passive radar of interest which is disposed within a jamming range with respect to the location of a passive radar jammer, based on the location of the virtual passive radar of interest and the locations of the sources of illumination and output information thereof;
    selecting sources of illumination as candidates for jamming in response to the signal strength of a target reflection signal received by the virtual passive radar of interest from the sources of illumination being equal to or greater than an acceptable received signal strength, based on the information on predicted sources of illumination; and
    picking out which sources of illumination to jam from the sources of illumination selected as candidates for jamming, based on how frequently the virtual passive radar of interest uses each of the selected candidates for jamming.

2. The method of claim 1, wherein the predicting of sources of illumination comprises predicting sources of illumination used by each of a plurality of virtual passive radars disposed in a movement region of the passive radar jammer, based on the locations of the virtual passive radars and the locations of the sources of illumination and output information thereof, and defining any of the virtual passive radars present within the jamming range as the virtual passive radar of interest.

3. The method of claim 2, wherein, when predicting sources of illumination used by each of the virtual passive radars, a designated number of sources of illumination or all nearby sources of illumination are predicted as the sources of illumination used, by using received signal strength or a visible path between transmitter and receiver.

4. The method of claim 2, wherein the jamming range is set depending on the type of a platform equipped with the passive radar jammer and the range detectable by the passive radars.

5. The method of claim 1, wherein the picking out of which sources of illumination to jam comprises calculating how frequently the virtual passive radar of interest uses each of the selected candidates for jamming, and picking out as many of these candidates as the number of frequency channels that can be emanated from the passive radar jammer, in order from most frequently used.

6. The method of claim 5, wherein, when picking out which sources of illumination to jam, in response to the virtual passive radar of interest using some of the candidates with equal frequency, the sources of illumination to jam are picked out in order from highest audio source quality.

7. The method of claim 5, wherein, when picking out which sources of illumination to jam, the sources of illumination to jam are picked out in order from highest average received strength of the target reflection signal.

8. An apparatus of selecting sources of illumination to jam, comprising:
    an information obtaining unit configured to obtain the locations of the virtual passive radars and the locations of the sources of illumination and output information thereof; and a processor configured to:
  pick out which sources of illumination to jam from the plurality of sources of illumination, based on the information obtained by the information obtaining unit;
  predict sources of illumination used by a virtual passive radar of interest, among the plurality of virtual passive radars, which is disposed within a jamming range with respect to the location of the passive radar jammer, based on the location of the virtual passive radar of interest and the locations of the sources of illumination and output information thereof;
  select sources of illumination as candidates for jamming in response to the signal strength of a target reflection signal received by the virtual passive radar of interest from the sources of illumination being equal to or greater than an acceptable received signal strength, based on the information on predicted sources of illumination; and
  pick out which sources of illumination to jam from the sources of illumination selected as candidates for jamming, based on how frequently the virtual passive radar of interest uses each of the selected candidates for jamming.

9. The apparatus of claim 8, wherein the processor is configured to predict sources of illumination used by each of a plurality of virtual passive radars disposed in a movement region of the passive radar jammer, based on the locations of the virtual passive radars and the locations of the sources of illumination and output information thereof, and define any of the virtual passive radars present within the jamming range as the virtual passive radar of interest.

10. The apparatus of claim 9, wherein, when predicting sources of illumination used by each of the virtual passive radars, the processor is configured to predict a designated number of sources of illumination or all nearby sources of illumination as the sources of illumination used, by using received signal strength or a visible path between transmitter and receiver.

11. The apparatus of claim 9, wherein the processor is configured to set the jamming range depending on the type of a platform equipped with the passive radar jammer and the range detectable by the passive radars.

12. The apparatus of claim 8, wherein the processor is configured to calculate how frequently the virtual passive radar of interest uses each of the selected candidates for jamming, and pick out as many of these candidates as the number of frequency channels that can be emanated from the passive radar jammer, in order from most frequently used.

13. The apparatus of claim 12, wherein, when picking out which sources of illumination to jam, in response to the virtual passive radar of interest using some of the candidates with equal frequency, the processor is configured to pick out the sources of illumination to jam in order from highest audio source quality.

14. The apparatus of claim 12, wherein, when picking out which sources of illumination to jam, the processor is configured to pick out the sources of illumination to jam in order from highest average received strength of the target reflection signal.

15. A non-transitory computer-readable recording medium storing a computer program, the computer program comprising instructions for a processor to perform a method of selecting sources of illumination to jam when the computer program is executed by the processor, the method comprising:
  predicting sources of illumination used by a virtual passive radar of interest which is disposed within a jamming range with respect to the location of a passive radar jammer, based on the location of the virtual passive radar of interest and the locations of the sources of illumination and output information thereof;
  selecting sources of illumination as candidates for jamming in response to the signal strength of a target reflection signal received by the virtual passive radar of interest from the sources of illumination being equal to or greater than an acceptable received signal strength, based on the information on predicted sources of illumination; and
  picking out which sources of illumination to jam from the sources of illumination selected as candidates for jamming, based on how frequently the virtual passive radar of interest uses each of the selected candidates for jamming.

16. The non-transitory computer-readable recording medium of claim 15, wherein the predicting of sources of illumination comprises predicting sources of illumination used by each of a plurality of virtual passive radars disposed in a movement region of the passive radar jammer, based on the locations of the virtual passive radars and the locations of the sources of illumination and output information thereof, and defining any of the virtual passive radars present within the jamming range as the virtual passive radar of interest.

17. The non-transitory computer-readable recording medium of claim 16, wherein, when predicting sources of illumination used by each of the virtual passive radars, a designated number of sources of illumination or all nearby sources of illumination are predicted as the sources of illumination used, by using received signal strength or a visible path between transmitter and receiver.

18. The non-transitory computer-readable recording medium of claim 16, wherein the jamming range is set depending on the type of a platform equipped with the passive radar jammer and the range detectable by the passive radars.

19. The non-transitory computer-readable recording medium of claim 15, wherein the picking out of which sources of illumination to jam comprises calculating how frequently the virtual passive radar of interest uses each of the selected candidates for jamming, and picking out as many of these candidates as the number of frequency channels that can be emanated from the passive radar jammer, in order from most frequently used.

20. The non-transitory computer-readable recording medium of claim 19, wherein, when picking out which sources of illumination to jam, the sources of illumination to jam are picked out in order from highest average received strength of the target reflection signal.

* * * * *